(12) United States Patent
Takatsuka et al.

(10) Patent No.: US 10,288,639 B2
(45) Date of Patent: May 14, 2019

(54) WHEEL SPEED DETECTING DEVICE

(71) Applicant: HONDA MOTOR CO., LTD., Minato-Ku, Tokyo (JP)

(72) Inventors: Kazuhiro Takatsuka, Saitama (JP); Yoshihiro Hashimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 159 days.

(21) Appl. No.: 15/454,133

(22) Filed: Mar. 9, 2017

(65) Prior Publication Data

US 2017/0269116 A1 Sep. 21, 2017

(30) Foreign Application Priority Data

Mar. 15, 2016 (JP) .................. 2016-051241

(51) Int. Cl.
| | |
|---|---|
| B60T 8/171 | (2006.01) |
| G01P 3/44 | (2006.01) |
| B60T 1/06 | (2006.01) |
| F16D 65/12 | (2006.01) |
| G01P 3/488 | (2006.01) |
| B60T 8/32 | (2006.01) |

(52) U.S. Cl.
CPC .............. *G01P 3/44* (2013.01); *B60T 1/065* (2013.01); *B60T 8/171* (2013.01); *F16D 65/12* (2013.01); *F16D 65/123* (2013.01); *G01P 3/488* (2013.01); *B60T 8/329* (2013.01)

(58) Field of Classification Search
CPC . G01P 3/44; G01P 3/488; B60T 1/065; B60T 8/171; B60T 8/1706; B60T 8/329; F16D 65/12; F16D 65/123
See application file for complete search history.

(56) References Cited

U.S. PATENT DOCUMENTS

| | | | |
|---|---|---|---|
| 6,492,805 | B1 | 12/2002 | Wakabayashi et al. |
| 2005/0247499 | A1 | 11/2005 | Toyoda |
| 2013/0026731 | A1 | 1/2013 | Mikura et al. |
| 2015/0042062 | A1 | 2/2015 | Takatsuka |
| 2018/0031595 | A1* | 2/2018 | Yasuhara .................. B62L 3/08 |

FOREIGN PATENT DOCUMENTS

| | | |
|---|---|---|
| JP | 2001-165949 A | 6/2001 |
| JP | 2002-079974 A | 3/2002 |

OTHER PUBLICATIONS

Extended European search report dated Jul. 17, 2017 regarding the corresponding EP Patent Application 17157995.6.

* cited by examiner

*Primary Examiner* — Helen C Kwok
(74) *Attorney, Agent, or Firm* — Carrier Blackman & Associates, P.C.; William D. Blackman; Joseph P. Carrier

(57) ABSTRACT

A wheel hub, a pulsar ring, and a magnetic sensor are provided. The wheel hub supports an axle. A brake disc is secured to the wheel hub. The pulsar ring is secured to the wheel hub. The magnetic sensor is configured to detect a passing of a pulsar hole disposed on the pulsar ring. The wheel hub forms a cylindrical outer peripheral surface as an outer peripheral side spigot portion. The brake disc includes a disc-side spigot portion in contact with the cylindrical outer peripheral surface. The pulsar ring includes a ring-side spigot portion in contact with the cylindrical outer peripheral surface. The brake disc and the pulsar ring are co-clamped and secured to a hub-side flange formed at the wheel hub.

8 Claims, 8 Drawing Sheets

WHEEL SPEED DETECTING DEVICE

TECHNICAL FIELD

The present invention relates to a wheel speed detecting device and especially relates to a wheel speed detecting device that detects a rotational speed of a wheel using a pulsar ring and a magnetic sensor.

BACKGROUND ART

Conventionally, there has been known a wheel speed detecting device that detects a rotating state of a pulsar ring mounted to a wheel by a magnetic sensor mounted to a vehicle body side. In such a wheel speed detecting device, positioning accuracy of the pulsar ring affects accuracy of the sensor output.

Patent Literature 1 discloses the following wheel speed detecting device. A pulsar ring includes pulsar holes as detected portions near the outer periphery. The pulsar ring forms a cylindrical-shaped convex-side spigot portion at a center in a radial direction by drawing. The convex-side spigot portion is inserted into a concave-side spigot portion formed on a wheel hub of a wheel to align a center position of the pulsar ring.

CITATION LIST

Patent Literatures

Patent Literature 1: JP 2001-165949 A

SUMMARY OF INVENTION

Technical Problem

However, with the technology disclosed in Patent Literature 1, a brake disc is mounted to a mounting surface disposed separately from the spigot portion of the wheel hub. This requires separately performing securing work of the pulsar ring and securing work of the brake disc to assemble the wheel, thereby causing a problem of increase in man-hours for assembly.

An object of the present invention is to provide a wheel speed detecting device that can solve the problem of the conventional technology and reduce the man-hours for assembly of the wheel while enhancing accuracy of attachment of a pulsar ring.

Solution to Problems

To achieve the afore-mentioned object, the present invention has a first feature in that a wheel speed detecting device comprising: a wheel hub (730) that supports an axle (770), a brake disc (700) being secured to the wheel hub (730); a pulsar ring (720) secured to the wheel hub (730); and a magnetic sensor (760) configured to detect a passing of a detected portion (722) disposed on the pulsar ring (720), wherein the wheel hub (730) forms a cylindrical outer peripheral surface (746) as an outer peripheral side spigot portion, the brake disc (700) includes a disc-side spigot portion (715) in contact with the cylindrical outer peripheral surface (746), the pulsar ring (720) includes a ring-side spigot portion (725) in contact with the cylindrical outer peripheral surface (746), and the brake disc (700) and the pulsar ring (720) are co-clamped and secured to a mounting portion (731) formed at the wheel hub (730) with a plurality of fastening members (733).

The present invention has a second feature in that a plurality of extension stays (721) are formed on the pulsar ring (720), the extension stays (721) extending outside in a radial direction with respect to the detected portion (722) and then bending in a peripheral direction, and ring-side through-holes (724) and the ring-side spigot portion (725) are formed at the extension stays (721), the fastening members (733) passing through the ring-side through-holes (724).

The present invention has a third feature in that in a radial direction, the cylindrical outer peripheral surface (746) is positioned between an opening (745) for the axle (770) to pass through and hub-side through-holes (742), the hub-side through-holes (742) being formed at the mounting portions (731) for the fastening members (733) to pass through, and the ring-side spigot portion (725) is disposed at a position separated outside in a radial direction from an outer peripheral section (750) of the pulsar ring (720).

The present invention has a fourth feature in that the pulsar ring (720) and the brake disc (700) are mounted to the mounting portion (731) in this order, the extension stays (721) include crank-shaped bent portions (751), the bent portions (751) displacing the ring-side spigot portion (725) in an axial direction, and when the pulsar ring (720) and the brake disc (700) are co-clamped to the mounting portion (731), an outer surface of the pulsar ring (720) in an axial direction (B) is positioned outside with respect to an outer surface of the brake disc (700) in an axial direction (A).

The present invention has a fifth feature in that the brake disc (700) and the pulsar ring (720) are overlappingly disposed in the axial direction.

The present invention has a sixth feature in that the pulsar ring (720) and the brake disc (700) are mounted to the mounting portion (731) in this order, and an axial dimension (L3) of the cylindrical outer peripheral surface (746) is smaller than a dimension of adding an axial dimension (L1) of the ring-side spigot portion (725) and an axial dimension (L2) of the disc-side spigot portion (715).

The present invention has a seventh feature in that the fastening member (733) is a bolt, and a spot facing hole (716) is formed on the brake disc (700), at least a part of head of the bolt entering into the spot facing hole (716).

Advantageous Effects of Invention

According to the first feature, a wheel speed detecting device comprising: a wheel hub (730) that supports an axle (770), a brake disc (700) being secured to the wheel hub (730); a pulsar ring (720) secured to the wheel hub (730); and a magnetic sensor (760) configured to detect a passing of a detected portion (722) disposed on the pulsar ring (720), wherein the wheel hub (730) forms a cylindrical outer peripheral surface (746) as an outer peripheral side spigot portion, the brake disc (700) includes a disc-side spigot portion (715) in contact with the cylindrical outer peripheral surface (746), the pulsar ring (720) includes a ring-side spigot portion (725) in contact with the cylindrical outer peripheral surface (746), and the brake disc (700) and the pulsar ring (720) are co-clamped and secured to a mounting portion (731) formed at the wheel hub (730) with a plurality of fastening members (733). Therefore, a cylindrical outer peripheral surface disposed at the brake disc ensures simultaneous positioning of the brake disc and the pulsar ring with the spigot structure, thereby easing assembly work and ensuring a reduction in man-hours for assembly. Furthermore, co-clamping the brake disc and the pulsar ring allows a reduction in the number of fastening members compared with a configuration where the brake disc and the pulsar ring are separately secured to the wheel hub.

According to the second feature, a plurality of extension stays (721) are formed on the pulsar ring (720), the extension stays (721) extending outside in a radial direction with respect to the detected portion (722) and then bending in a peripheral direction, and ring-side through-holes (724) and the ring-side spigot portion (725) are formed at the extension stays (721), the fastening members (733) passing through the ring-side through-holes (724). Therefore, disposing the extension stays can achieve a spigot fitting between the pulsar ring and the wheel hub. Additionally, the extension stays double as the spigot fitting function and the mounting function to the wheel hub. This eases the positioning of the pulsar ring and also can reduce a weight of the pulsar ring.

According to the third feature, in a radial direction, the cylindrical outer peripheral surface (746) is positioned between an opening (745) for the axle (770) to pass through and hub-side through-holes (742), the hub-side through-holes (742) being formed at the mounting portions (731) for the fastening members (733) to pass through, and the ring-side spigot portion (725) is disposed at a position separated outside in a radial direction from an outer peripheral section (750) of the pulsar ring (720). Therefore, for example, it is difficult to mold the pulsar ring in a configuration where the ring-side spigot portions are disposed radially inward with respect to the outer peripheral section of the pulsar ring. Meanwhile, the ring-side spigot portions are separate from the outer peripheral section of the pulsar ring outside in the radial direction. This ensures easily manufacturing the pulsar ring by presswork.

According to the fourth feature, the pulsar ring (720) and the brake disc (700) are mounted to the mounting portion (731) in this order, the extension stays (721) include crank-shaped bent portions (751), the bent portions (751) displacing the ring-side spigot portion (725) in an axial direction, and when the pulsar ring (720) and the brake disc (700) are co-clamped to the mounting portion (731), an outer surface of the pulsar ring (720) in an axial direction (B) is positioned outside with respect to an outer surface of the brake disc (700) in an axial direction (A). Therefore, disposing the bent portions can enhance structural strength of the pulsar ring. Additionally, the pulsar ring is interposed between the brake disc and the wheel hub. This allows a heat generated by the brake disc to escape to the wheel hub side. This prevents a thermal distortion of the thin sheet-shaped pulsar ring, ensuring excellently maintaining the detection accuracy of the wheel speed detecting device.

Furthermore, without removal of the magnetic sensor secured to the vehicle body side, the wheel can be attached and removed. In detail, for example, an interval between the pulsar ring and the magnetic sensor is usually small, several millimeters. Therefore, when the outer surface of the pulsar ring in the axial direction is positioned inside with respect to the outer surface of the brake disc in the axial direction, there is a possibility that the magnetic sensor interferes with the brake disc when the wheel is removed. In this respect, as long as the outer surface of the pulsar ring in the axial direction is positioned outside with respect to the outer surface of the brake disc in the axial direction, the magnetic sensor does not interfere with the brake disc, ensuring easing the work to attach and remove the wheel.

According to the fifth feature, the brake disc (700) and the pulsar ring (720) are overlappingly disposed in the axial direction. Therefore, this reduces a projection of the pulsar ring to the outside in the axial direction and can prevent a deformation of the pulsar ring when the wheel is attached to the vehicle body side.

According to the sixth feature, the pulsar ring (720) and the brake disc (700) are mounted to the mounting portion (731) in this order, and an axial dimension (L3) of the cylindrical outer peripheral surface (746) is smaller than a dimension of adding an axial dimension (L1) of the ring-side spigot portion (725) and an axial dimension (L2) of the disc-side spigot portion (715). Therefore, reducing the axial dimension of the cylindrical outer peripheral surface to the minimum length at which the brake disc can be positioned allows a reduction in thickness of the wheel hub and the weight reduction.

According to the seventh feature, the fastening member (733) is a bolt, and a spot facing hole (716) is formed on the brake disc (700), at least a part of head of the bolt entering into the spot facing hole (716). Therefore, an amount that the bolt head projects from the surface of the brake disc is reduced to ensure preventing the interference with other components such as the magnetic sensor and the brake caliper during the attachment and removal of the wheel.

DESCRIPTION OF EMBODIMENTS

Figure 1:
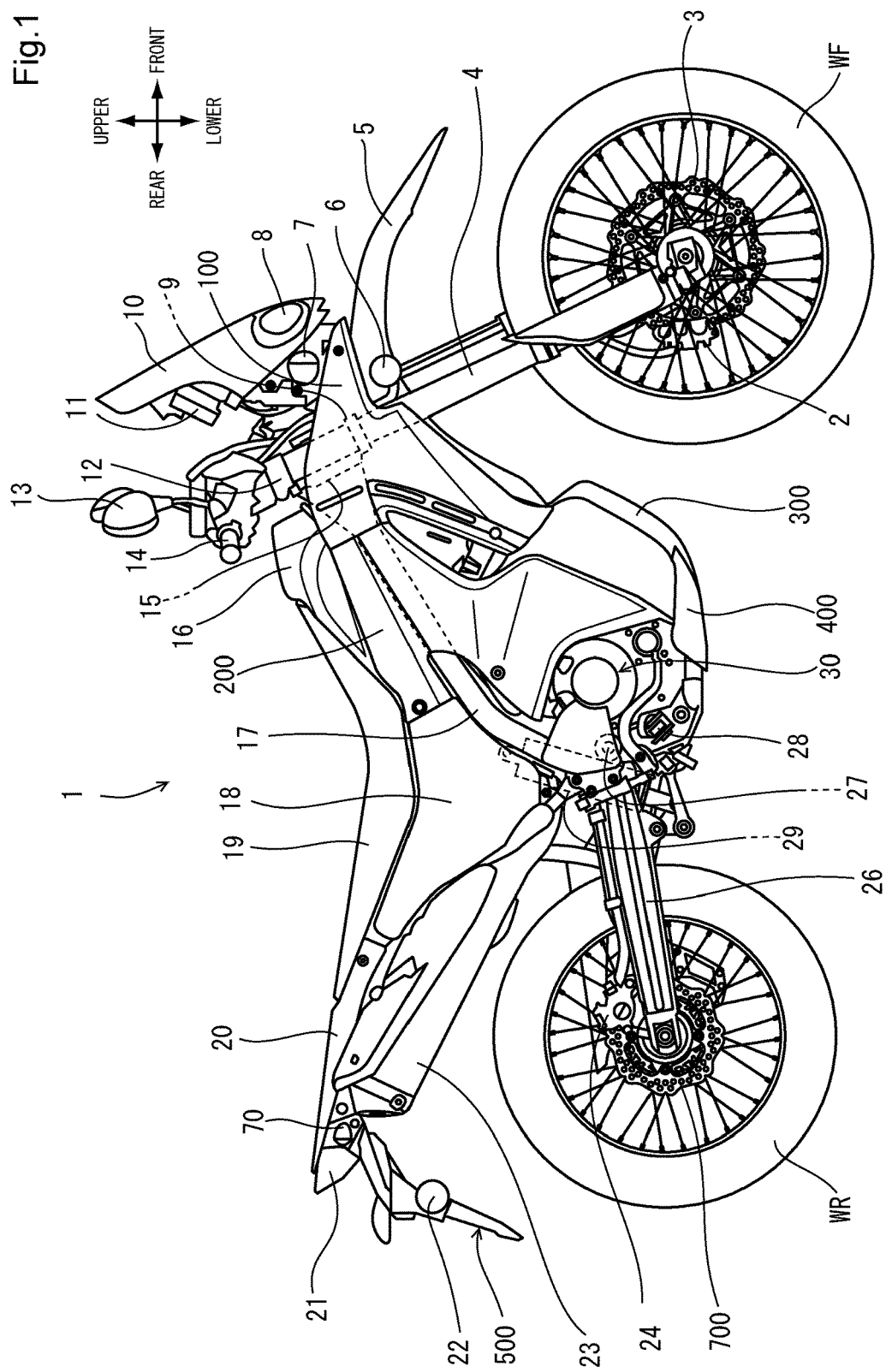
FIG. 1 is a right side view of a motorcycle according to one embodiment of the present invention.

Preferred embodiments of the present invention will be described in detail below referring to the drawings. FIG. 1 is a right side view of a motorcycle 1 according to one embodiment of the present invention. The motorcycle 1 is an off-road type saddle-ride type vehicle that transmits a driving power from an engine 30 as a power source to a rear wheel WR to travel.

A head pipe 15 is disposed at an end portion of a body frame 17 on a front side of a vehicle body. The head pipe 15 swingably journals an unillustrated steering stem. A right and left pair of front forks 4 are supported by a top bridge 12 and a bottom bridge 9 secured to the steering stem at the top and bottom of the head pipe 15. The front forks 4 rotatably journal a front wheel WF. A brake disc 3 and a brake caliper 2 are disposed at the left side of the front wheel WF in a vehicle width direction. A right and left pair of rearview mirrors 13 are mounted to a steering handlebar 14 secured to the top bridge 12.

The engine 30 is disposed below the body frame 17. A pivot 27 is disposed at a rear end lower portion of the body frame 17. The pivot 27 swingably journals a front end portion of a swing arm 26 that rotatably journals the rear wheel WR. A rear cushion 29 suspends a front side of the swing arm 26 to the body frame 17. A right and left pair of footrest steps 28 are mounted to lower sides of the pivots 27. A brake disc 700 and a brake caliper 24 are disposed at the right side of the rear wheel WR in the vehicle width direction.

A head light 8 secured to the head pipe 15 side, a right and left pair of winker devices 7, a meter device 11 such as a speed meter and a trip meter that displays information, and a large-sized screen 10 that covers up to a peripheral area of the head light 8 are disposed in front of the steering handlebar 14. A front fender 5 secured to the front fork 4 is disposed below the winker device 7. A right and left pair of side reflectors 6 are mounted to the right and left of the front fender 5 in the vehicle width direction.

A fuel tank 16 secured to the body frame 17 is disposed between the steering handlebar 14 and a seat 19. A side cowl 18 is disposed below the seat 19. A seat cowl 20 is disposed at a rear of the seat 19. At the rear of the seat cowl 20, a tail lamp device 21 and a right and left pair of rear-side winker devices 70 are disposed. Underneath the tail lamp device 21, a rear device 500 including a rear fender and a rear side reflector 22 are disposed. A combustion gas from the engine 30 is exhausted from a muffler 23 on the right side in the vehicle width direction.

A right and left pair of shroud members 100 constituting a radiator shroud are disposed outside the front forks 4 in the vehicle width direction. A right and left pair of side cowls 200 as a first cover member are coupled to the rear portions of the shroud members 100. Lower end portions of the side cowls 200 are coupled via an under cowl 400 as a second cover member positioned at the center in the vehicle width direction. A front lower cowl 300 as a third cover member positioned at the center in the vehicle width direction is coupled to a front end of the under cowl 400. Both end portions of the front lower cowl 300 outside in the vehicle width direction are each coupled to the side cowls 200. The shroud members 100, the side cowls 200, the under cowl 400, and the front lower cowl 300 each can be made of, for example, a hard resin.

Figure 2:
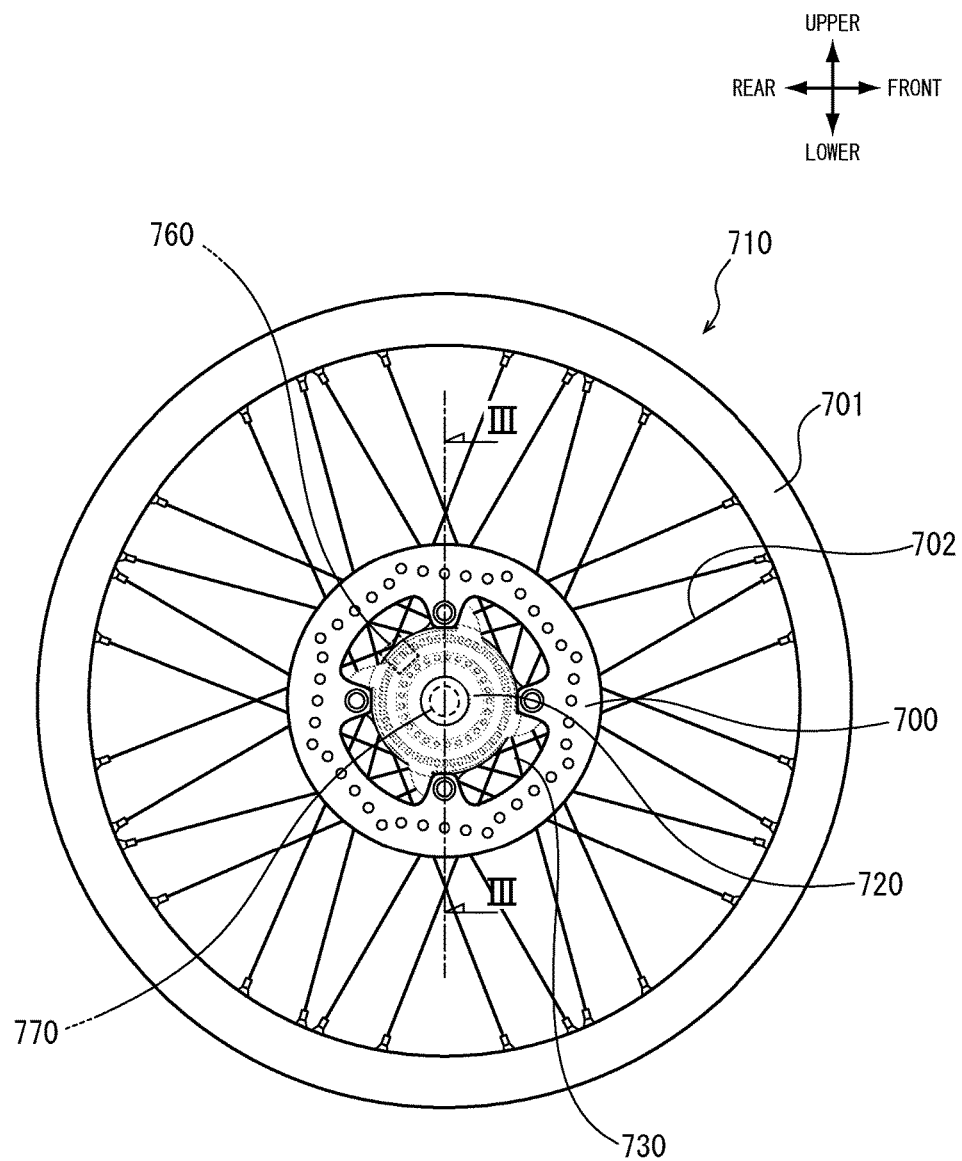
FIG. 2 is a front view of a wheel assembly of a rear wheel WR.

FIG. 2 is a front view of a wheel assembly 710 of the rear wheel WR. A plurality of spokes 702 supporting a wheel rim 701 are secured to a wheel hub 730 that rotatably journals an axle 770. A pulsar ring 720 and the brake disc 700 with a diameter larger than this pulsar ring 720 are co-clamped and secured to the wheel hub 730. The pulsar ring 720 is to sense a rotating state of the rear wheel by a magnetic sensor 760.

Figure 3:
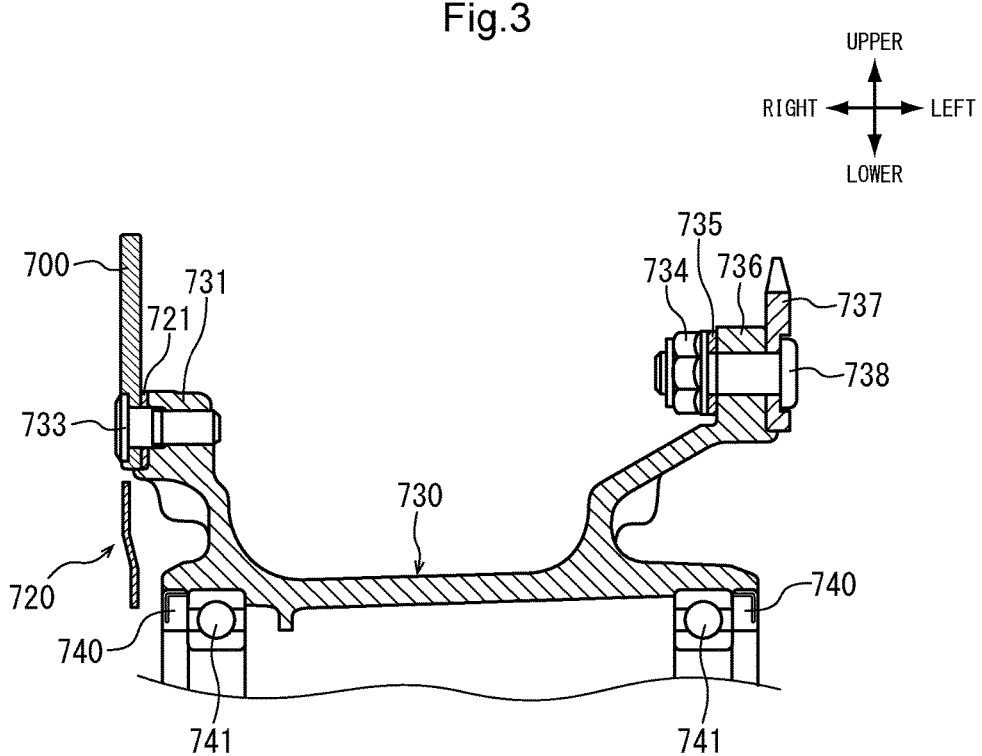
FIG. 3 is a cross-sectional view taken along the line III-III in FIG. 2.

FIG. 3 is a cross-sectional view taken along the line III-III in FIG. 2. A right and left pair of bearings 741 to support the axle 770 are disposed at an inner peripheral surface of the wheel hub 730. Dust seals 740 are attached to outsides of the bearings 741 in the vehicle width direction. A driven sprocket 737 is secured to a disc supporting portion 736 extending to the left side of the wheel hub 730 in the vehicle width direction. A drive chain to transmit a driving power from the engine 30 engages with the driven sprocket 737. The driven sprocket 737 is secured to the disc supporting portion 736 with a hexagonal hole bolt 738 and a nut 734 screwed interposing a washer 735.

Meanwhile, a hub-side flange 731 as a mounting portion extends at the right of the wheel hub 730 in the vehicle width direction. An extension stay 721 disposed at the pulsar ring 720 and the brake disc 700 are co-clamped and secured to the hub-side flange 731 with a hexagonal hole bolt 733 as a fastening member.

Figure 4:
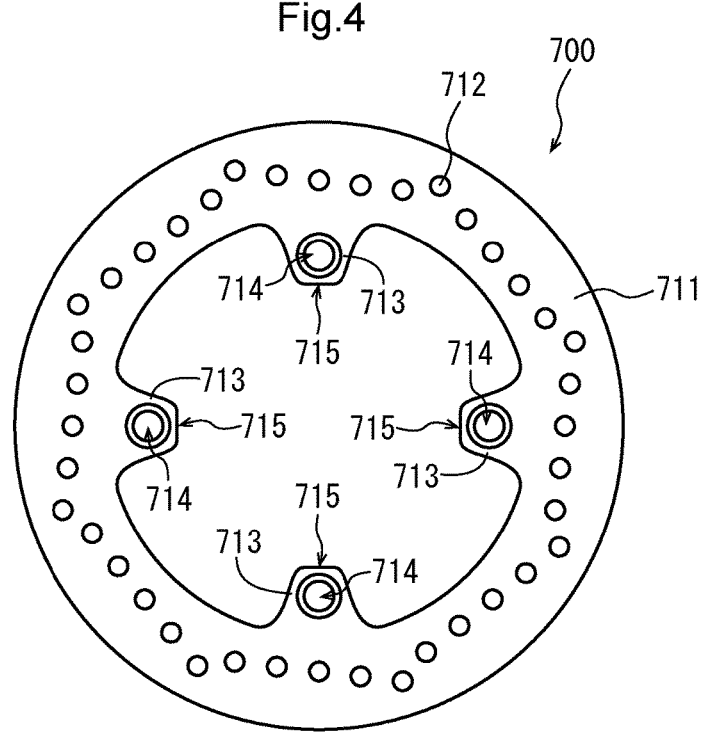
FIG. 4 is a front view of a brake disc.

FIG. 4 is a front view of the brake disc 700. A main body 711 on which a plurality of punch holes 712 are disposed is formed of a steel plate with a predetermined thickness (for example, 5 mm). Four disc-side flanges 713 extending radially inward are formed on an inner peripheral side of the main body 711. Disc-side through-holes 714 through which the hexagonal hole bolts 733 pass are formed on the disc-side flanges 713. Disc-side spigot portions 715 constituting a spigot fitting are formed at end portions radially inward of the disc-side flanges 713.

Figure 5:
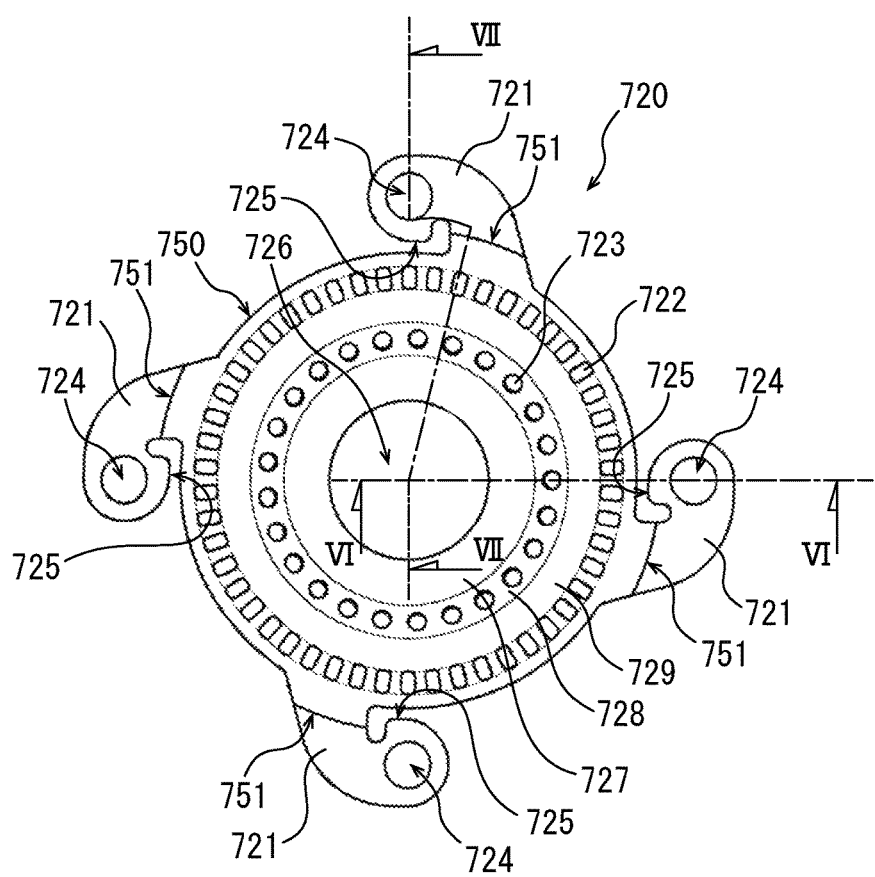
FIG. 5 is a front view of a pulsar ring.
Figure 6:
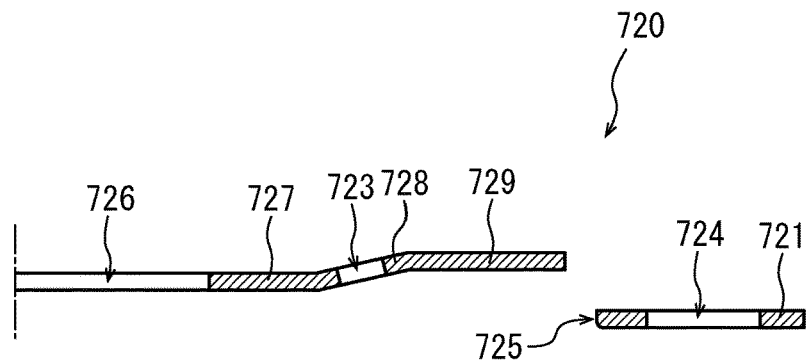
FIG. 6 is a cross-sectional view taken along the line VI-VI in FIG. 5.
Figure 7:
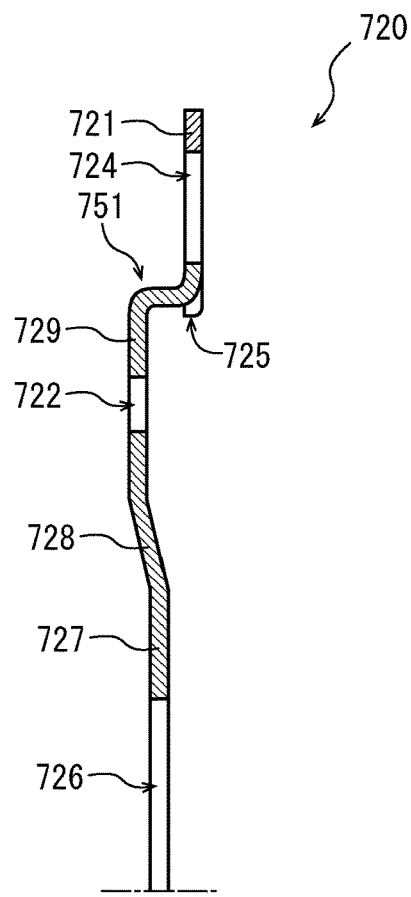
FIG. 7 is a cross-sectional view taken along the line VII-VII in FIG. 5.

FIG. 5 is a front view of the pulsar ring 720. Furthermore, FIG. 6 is a cross-sectional view taken along the line VI-VI in FIG. 5. FIG. 7 is a cross-sectional view taken along the line VII-VII in FIG. 5. The pulsar ring 720 formed by presswork is made of the steel plate with a predetermined thickness (for example, 2 mm).

An opening 726 for the axle 770 to pass through is formed at the center of the pulsar ring 720. A first planar surface 727 is disposed outside the opening 726. An inclined portion 728 is disposed outside the first planar surface 727. Circular removal holes 723 arranged at regular intervals in a peripheral direction are disposed on the inclined portion 728. A second planar surface 729 is disposed outside the inclined portion 728. Pulsar holes 722 as detected portions arranged at regular intervals in the peripheral direction are disposed on the second planar surface 729. In this embodiment, the pulsar holes 722 are approximately rectangular-shaped through-holes.

A circular outer peripheral section 750 is formed outside the second planar surface 729. The extension stays 721 are disposed at four sites on the outer peripheral section 750. In the extension stay 721, a ring-side through-hole 724 through which the hexagonal hole bolt 733 passes and a crank-shaped bent portion 751 are formed. This bent portion 751 disposes the ring-side spigot portion 725 displaced to the left side in the vehicle width direction (vehicle body center side) with respect to the first planar surface 727.

Figure 8:
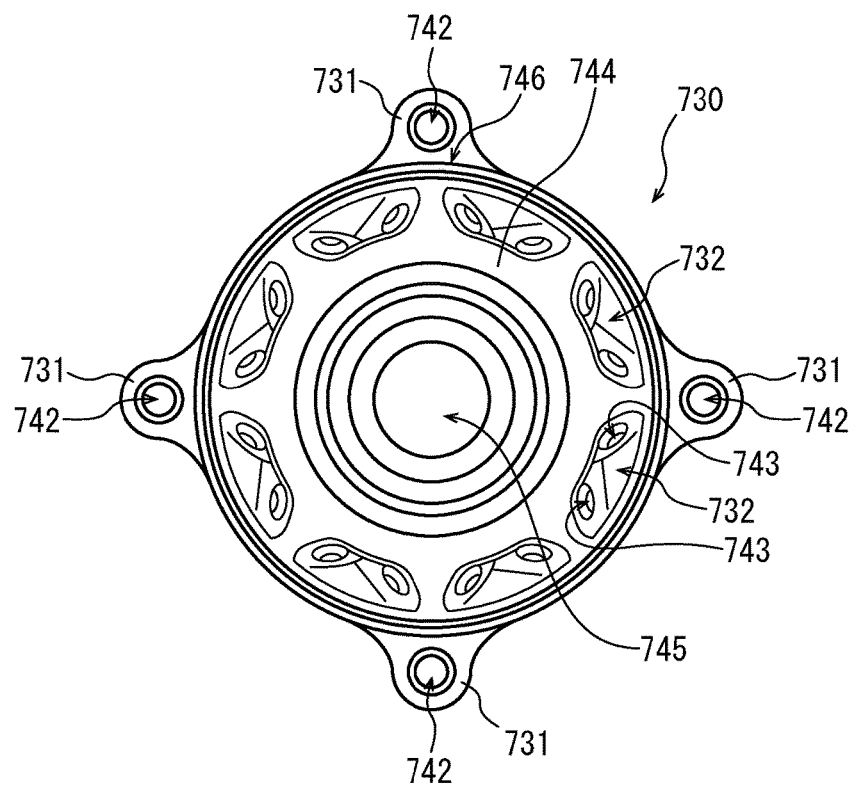
FIG. 8 is a front view of a wheel hub.

FIG. 8 is a front view of the wheel hub 730. At a center of the wheel hub 730, an opening 745 for the axle 770 to pass through is formed. A main body 744 outside the opening 745 includes concaves 732 where lock holes 743 to lock the end portions of the spokes 702 are formed. Then, the outer peripheral surface on the right side of the main body 744 in the vehicle width direction is formed as a cylindrical outer peripheral surface 746 constituting the spigot fitting. The hub-side flanges 731 as mounting portions are disposed at four sites on the cylindrical outer peripheral surface 746. At the hub-side flanges 731, hub-side through-holes 742 to which the hexagonal hole bolts 733 are screwed are formed.

Figure 9:
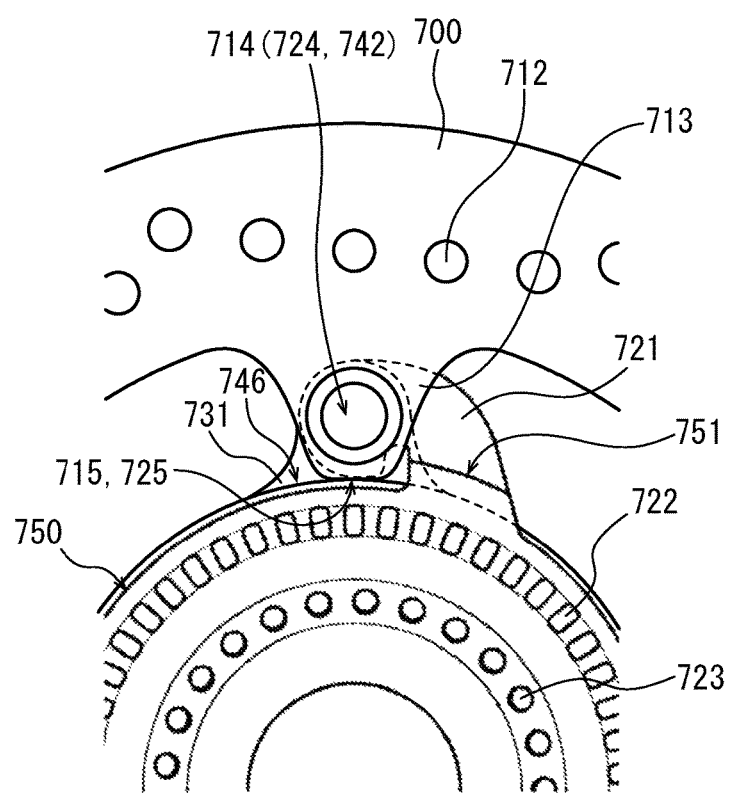
FIG. 9 is a partial enlarged view of FIG. 1.
Figure 10:
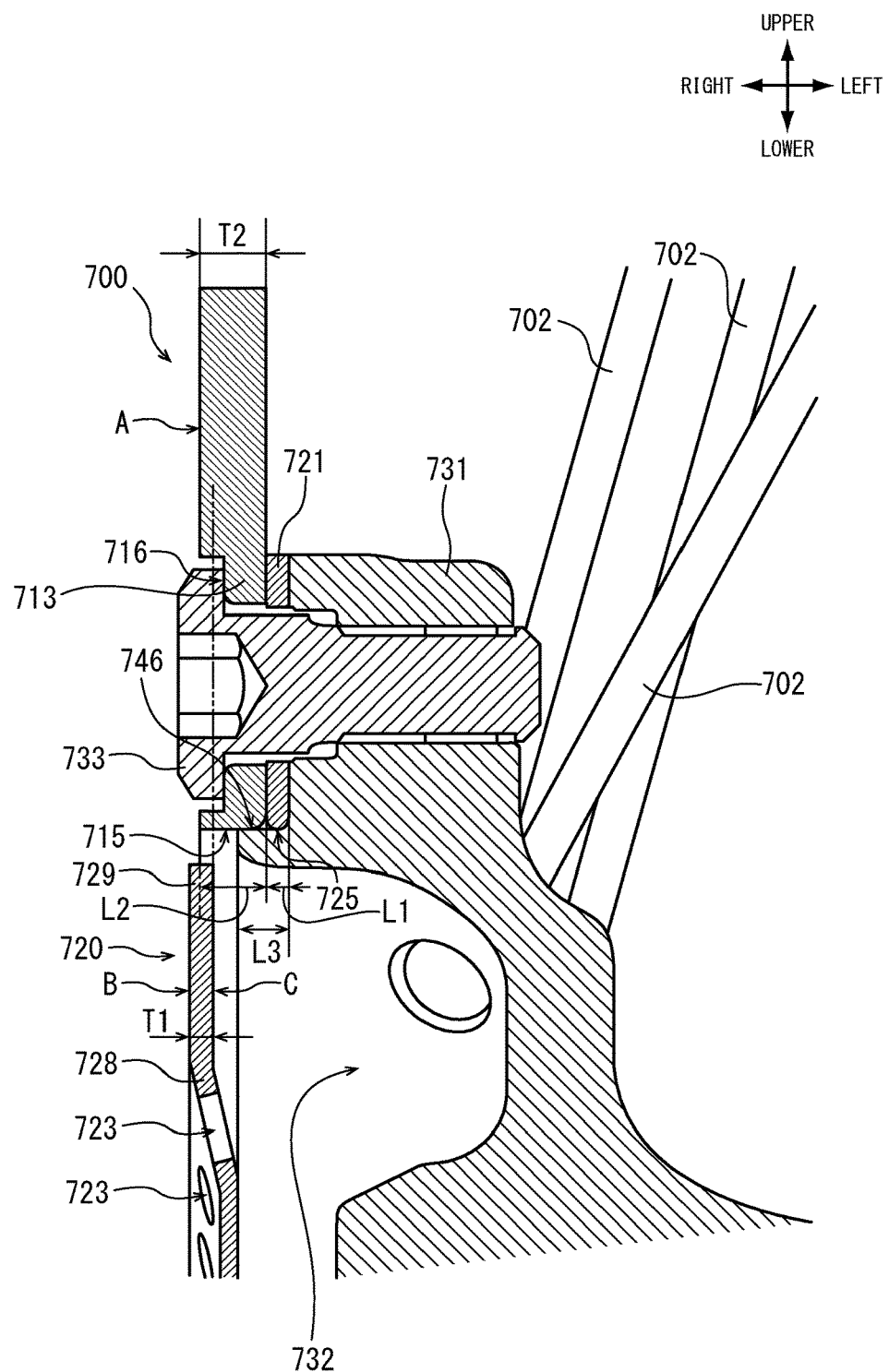
FIG. 10 is an enlarged cross-sectional view of a co-clamped part.

FIG. 9 is a partial enlarged view of FIG. 1. Further, FIG. 10 is an enlarged cross-sectional view of the co-clamped part. With the wheel speed detecting device according to the embodiment, the extension stays 721 of the pulsar ring 720 and the disc-side flanges 713 of the brake disc 700 are co-clamped to the hub-side flanges 731 on the wheel hub 730. This causes the disc-side spigot portions 715 and the ring-side spigot portions 725 to abut on the cylindrical outer peripheral surface 746. Thus, the brake disc 700 and the pulsar ring 720 are simultaneously positioned.

Confirming the configuration again, at the wheel hub 730, the cylindrical outer peripheral surface 746 as the outer peripheral side spigot portion is formed. The disc-side spigot portions 715 in contact with the cylindrical outer peripheral surface 746 are disposed at the brake disc 700. The ring-side spigot portions 725 in contact with the cylindrical outer peripheral surface 746 are disposed at the pulsar ring 720. Thus, the brake disc 700 and the pulsar ring 720 are co-clamped and secured to the hub-side flange 731 with the hexagonal hole bolt 733 as the fastening member.

This ensures the simultaneous positioning of the brake disc 700 and the pulsar ring 720 with the cylindrical outer peripheral surface 746 and the spigot structure, thereby easing the assembly work and ensuring the reduction in man-hours for assembly. Furthermore, co-clamping the brake disc 700 and the pulsar ring 720 allows the reduction in the number of fastening members compared with the configuration where the brake disc 700 and the pulsar ring 720 are separately secured to the wheel hub 730.

Additionally, the extension stays 721 of the pulsar ring 720 have the shape extending outside in the radial direction with respect to the pulsar holes 722 and then bending in the peripheral direction. The ring-side spigot portions 725 are formed at the positions radially inward of the ring-side through-holes 724 for the hexagonal hole bolts 733 to pass through. This achieves the spigot fitting between the pulsar ring 720 and the wheel hub 730. Then, the extension stays 721 double as the spigot fitting function and the mounting function to the wheel hub 730. This eases the positioning of the pulsar ring 720 and also can reduce the weight of the pulsar ring 720.

In the radial direction, the cylindrical outer peripheral surface 746 of the wheel hub 730 is positioned between the opening 745 for the axle 770 to pass through and the hub-side through-holes 742 for the hexagonal hole bolts 733 to pass through. The ring-side spigot portions 725 are disposed at the positions separated outside in the radial direction from the outer peripheral section 750 of the pulsar ring 720. This, for example, makes it difficult to mold the pulsar ring 720 in a configuration where the ring-side spigot portions 725 are disposed radially inward with respect to the outer peripheral section 750 of the pulsar ring 720. Meanwhile, in this embodiment, the ring-side spigot portions 725 are separate from the outer peripheral section of the pulsar ring 720 outside in the radial direction. This ensures easily manufacturing the pulsar ring 720 by presswork.

Furthermore, the bent portions 751 disposed at the extension stays 721 enhance structural strength of the pulsar ring 720, ensuring the weight reduction of the pulsar ring 720. Additionally, the extension stays 721 are interposed between the brake disc 700 and the wheel hub 730. This allows a heat generated by the brake disc 700 at a braking to escape to the wheel hub 730 side. This prevents a thermal distortion of the thin sheet-shaped pulsar ring 720, ensuring excellently maintaining the detection accuracy.

Here, an interval between the pulsar ring 720 and the magnetic sensor 760 is usually small, several millimeters. Therefore, assuming that the outer surface of the pulsar ring 720 in the axial direction is positioned inside with respect to the outer surface of the brake disc 700 in the axial direction, there is a possibility that the magnetic sensor 760 interferes with the inner peripheral section of the brake disc 700 when the rear wheel WR is removed from the vehicle body. In this respect, as long as the outer surface of the pulsar ring 720 in the axial direction is positioned outside with respect to the outer surface of the brake disc 700 in the axial direction, the magnetic sensor 760 does not interfere with the brake disc 700, easing the work to attach and remove the wheel.

Referring to FIG. 10, this embodiment overlappingly disposes the brake disc 700 and the pulsar ring 720 in the axial direction. In detail, an inner surface of the pulsar ring 720 in the axial direction C with a thickness T1 is positioned inside in the axial direction with respect to an outer surface of the brake disc 700 in the axial direction A with a thickness T2. This reduces the projection of an outer surface of the pulsar ring 720 in the axial direction B to the outside in the axial direction and can prevent a deformation of the pulsar ring 720 when the rear wheel WR is attached to the vehicle body.

Furthermore, an axial dimension L3 of the cylindrical outer peripheral surface 746 is smaller than a dimension of adding an axial dimension L1 of the ring-side spigot portion 725 and an axial dimension L2 of the disc-side spigot portion 715. Accordingly, reducing the axial dimension of the cylindrical outer peripheral surface 746 to the minimum length at which the brake disc 700 can be positioned allows a reduction in thickness of the wheel hub 730 and the weight reduction.

Furthermore, a spot facing hole 716 into which a head portion of the hexagonal hole bolt 733 enters is formed on the disc-side flange 713 of the brake disc 700. This reduces an amount that the bolt head projects from the surface of the brake disc 700 to ensure preventing the interference with the magnetic sensor 760, the brake caliper 24, and a similar member during the attachment and removal of the wheel.

Note that, the form of the motorcycle, the shapes and the structures of the pulsar ring and the wheel hub, the structure of the magnetic sensor, and a similar specification are not limited to the above-described embodiments but various modifications are possible. For example, the structure of the spigot portion according to the present invention is not limited to the spoke wheel but is also applicable to a cast wheel. Additionally, the fastening member is not limited to the hexagonal hole bolt but various members such as an ordinary bolt are applicable. The above-described embodiments describe the structure of the rear wheel for the motorcycle but are also applicable to the front wheel. The wheel speed detecting device according to the present invention is not limited to the motorcycle but is applicable to various vehicles such as saddle-ride type three/four-wheeled vehicles.

REFERENCE SIGNS LIST

1 . . . Motorcycle (vehicle)
700 . . . Brake disc
715 . . . Disc-side spigot portion
716 . . . Spot facing hole
720 . . . Pulsar ring
721 . . . Extension stay
722 . . . Pulsar hole (detected portion)
724 . . . Ring-side through-hole
725 . . . Ring-side spigot portion
726 . . . Opening
730 . . . Wheel hub
731 . . . Hub-side flange (mounting portion)
733 . . . Hexagonal hole bolt (fastening member)
742 . . . Hub-side through-hole
745 . . . Opening
746 . . . Cylindrical outer peripheral surface
751 . . . Bent portion
760 . . . Magnetic sensor
A . . . Outer surface of a brake disc in an axial direction
B . . . Outer surface of a pulsar ring in an axial direction
C . . . Inner surface of a pulsar ring in an axial direction
L1 . . . Axial dimension of a ring-side spigot portion
L2 . . . Axial dimension of a disc-side spigot portion
L3 . . . Axial dimension of a cylindrical outer peripheral surface
WR . . . Rear wheel

What is claimed is:

1. A wheel speed detecting device comprising:
a wheel hub that supports an axle, a brake disc being secured to the wheel hub;
a pulsar ring secured to the wheel hub; and
a magnetic sensor configured to detect a passing of a detected portion disposed on the pulsar ring,
wherein:
the wheel hub forms a cylindrical outer peripheral surface as an outer peripheral side spigot portion,
the brake disc includes a disc-side spigot portion in contact with the cylindrical outer peripheral surface,
the pulsar ring includes a ring-side spigot portion in contact with the cylindrical outer peripheral surface,
a plurality of extension stays are formed on the pulsar ring, the extension stays extending outside in a radial direction with respect to the detected portion and then bending in a peripheral direction,
ring-side through-holes and the ring-side spigot portion are formed at the extension stays, and
the brake disc and the pulsar ring are co-clamped and secured to a mounting portion formed at the wheel hub with a plurality of fastening members passing through the ring-side through-holes.

2. The wheel speed detecting device according to claim 1, wherein, in a radial direction, the cylindrical outer peripheral surface is positioned between an opening for the axle to pass through and hub-side through-holes, the hub-side through-holes being formed at the mounting portion for the fastening members to pass through, and
the ring-side spigot portion is disposed at a position separated outside in a radial direction from an outer peripheral section of the pulsar ring.

3. The wheel speed detecting device according to claim 1, wherein:
the pulsar ring and the brake disc are mounted to the mounting portion in this order,
the extension stays include crank-shaped bent portions, the bent portions displacing the ring-side spigot portion in an axial direction, and
when the pulsar ring and the brake disc are co-clamped to the mounting portion, an outer surface of the pulsar ring in an axial direction is positioned outside with respect to an outer surface of the brake disc in an axial direction.

4. The wheel speed detecting device according to claim 1, wherein the brake disc and the pulsar ring are overlappingly disposed in an axial direction.

5. The wheel speed detecting device according to claim 3, wherein the brake disc and the pulsar ring are overlappingly disposed in the axial direction.

6. The wheel speed detecting device according to claim 1, wherein:
the pulsar ring and the brake disc are mounted to the mounting portion in this order, and
an axial dimension of the cylindrical outer peripheral surface is smaller than a dimension of adding an axial dimension of the ring-side spigot portion and an axial dimension of the disc-side spigot portion.

7. The wheel speed detecting device according to claim 1, wherein the fastening members are bolts,
and wherein a spot facing hole is formed on the brake disc, at least a part of a head of one of the bolts entering into the spot facing hole.

8. The wheel speed detecting device according to claim 1, wherein the ring-side spigot portion is defined at a position radially inward of the ring-side through-hole in an end region of the extension stay.

* * * * *